United States Patent
Bonhoure et al.

(10) Patent No.: US 6,334,344 B1
(45) Date of Patent: Jan. 1, 2002

(54) METHOD FOR REAL TIME RECONFIGURATION OF TRAJECTORIES FOR AN AIRCRAFT

(75) Inventors: Fabienne Bonhoure, Velizy; Fabien Inglese, Issy les Moulineaux, both of (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/601,343
(22) PCT Filed: Dec. 15, 1999
(86) PCT No.: PCT/FR99/03149
   § 371 Date: Aug. 17, 2000
   § 102(e) Date: Aug. 17, 2000
(87) PCT Pub. No.: WO00/38030
   PCT Pub. Date: Jun. 29, 2000

(30) Foreign Application Priority Data

Dec. 18, 1998 (FR) .............................................. 98 16026

(51) Int. Cl.$^7$ .............................................. B64C 13/18
(52) U.S. Cl. ........................... 70/11; 244/75 R; 244/190
(58) Field of Search ..................... 701/11, 4; 244/75 R, 244/190

(56) References Cited

U.S. PATENT DOCUMENTS 5,301,112 A * 4/1994 Gold et al. .................... 701/4
5,785,281 A * 7/1998 Peter et al. ................. 244/190

* cited by examiner

Primary Examiner—William A. Cuchlinski, Jr.
Assistant Examiner—Olga Hernandez
(74) Attorney, Agent, or Firm—Oblon, Spivak, McClelland, Maier & Neustadt, P.C.

(57) ABSTRACT

A process for real-time reconfiguring of trajectories or airborne vehicles in order to adapt a mission to suit a new situation that has arisen through the occurrence of a disrupting event. The process updates real-time context data modified by the occurrence of the disrupting event and analyzes the new real-time context thus obtained in order to select a predefined reconfiguration method chosen from a set of different predefined methods stored in memory, each of these methods directly translating operational strategies customarily employed by aircrew in a given real-time context so as to determine a new trajectory which best suits the current real-time context. The process then executes the selected predefined method, which determines a new trajectory according to the mission data and the real-time context, displays the new trajectory on a display, overlayed on the current trajectory and, if the pilot of the airborne vehicle validates this new trajectory, transmits the information of this new trajectory to an automatic pilot device.

7 Claims, 2 Drawing Sheets

METHOD FOR REAL TIME RECONFIGURATION OF TRAJECTORIES FOR AN AIRCRAFT

BACKGROUND OF THE INVENTION

Field of the Invention

The present invention relates to a process for producing trajectories for an airborne vehicle.

It applies in particular, although not exclusively, to civil or military aviation and to airborne vehicles flown or alternatively guided from the ground.

In general, correct execution of the mission of an airborne vehicle relies on the defining of a flight plan which is produced during mission preparation. This flight plan comprises, among other things, a nominal trajectory to be followed during the mission, defined in a five-dimensional space: latitude, longitude, altitude, flight time and fuel reserves. However, unforeseen events may occur during execution of the mission, making the nominal trajectory envisaged during mission preparation unsuitable, or even obsolete. These events may, for example, consist in a breakdown of a vital part of the airborne vehicle, new weather conditions, a change in objective, or the emergence of a danger area crossed during that part of the nominal trajectory that remains to be covered. It is therefore necessary, during flight, to alter that part of the intended nominal trajectory that remains to be covered, with a view to jeopardizing the mission objectives as little as possible.

The nominal trajectory chosen during mission preparation is defined by a series of compulsory waypoints to pass through according to altitudes, headings, schedules, with minimum fuel reserves and, possibly, by positions and extended areas of danger that are to be avoided.

A modification, during flight, of a part of the nominal trajectory assigned during mission preparation that has yet to be covered, in order to take account of an event which was not taken into consideration during mission preparation is a difficult task because it has to be finalized quickly even though there are a great many obvious options for reconfiguring the nominal trajectory, among which it is difficult to discern, quickly, the one which best satisfies the numerous constraints encountered, whether these be associated with the airborne vehicle flight conditions, its maneuverability, its fuel-dependent range or the objectives of the mission, this difficulty being all the greater as these constraints often translate into contradictory requirements such as safety, economy, effectiveness, for example.

Attempts have therefore been made at easing the task of an aircraft pilot when the need to modify the nominal trajectory arises during flight, by providing him with the assistance of an automatic device which proposes to him a reconfigured trajectory that can be used by an automatic pilot system and by a cartographic display, and which is optimized from the point of view of satisfying the instantaneous constraints imposed by the flight conditions of the airborne vehicle, its maneuverability, its fuel-dependent range, the objectives of the mission and the relative importance attributed to these at that particular time.

The various processes for recalculating trajectories can be executed by an on-board computer which may or may not be assisted by an operator, allowing the pilot of an airborne vehicle in the course of performing a mission to be proposed a reconfiguration of his nominal trajectory by an automatic pilot system and by a cartographic display and minimizing the impact that an unforeseen event has on the safety and effectiveness of his mission.

Some of these processes call on cost optimization methods. These determine, as a function of the spatio-temporal position and of the maneuverability of the airborne vehicle, all of the detour paths that satisfy the new constraints imposed by the unforeseen event and which allow the nominal trajectory to be regained as quickly as possible keeping to the schedule and fuel-dependent range envisaged at the time of mission preparation and then proceed to select, of all the possible detour paths, the one which presents the minimum cost, that is to say the one which is optimum in terms of mission safety, economy and effectiveness. The cost of a trajectory is evaluated on the basis of its routing over a cost area superposed on the region overflown during the mission. The cost area is defined using a grid of points with a uniform mesh size, the actual size of which depends on the desired accuracy, each point in the grid being allocated a preference score devised according to the mission constraints in terms of effectiveness and safety. The cost of a trajectory corresponds to the inverse of the sum of the preference scores allocated to each point encountered on the cost area. These processes require an on-board computer with high processing power and a great deal of memory to implement them because they involve updating the cost area in real time to take account of the advent of an unforeseen event, followed by the detailed calculation, still in real time, of a number of possible detour paths and a calculation of their respective costs.

Other processes, calling upon levels of representation of a mission in greater or lesser detail, attempt to study a great many alternative solutions with a view to assigning them an effectiveness or risk criterion. However, in order to be able to provide an answer in real time, these processes require a great deal of processing power which is incompatible with the power of the computers which currently are fitted on board airborne vehicles. Furthermore, they require the intervention of the pilot, who has to divert his attention from the current mission to examine all the proposed solutions, of which there may be a great many, in order to select one of them. In this context, the pilot does not have control over the time when he has to make his choice, because the solutions put forward very soon become obsolete because of the speed with which the airborne vehicle is moving. What this means is that these processes are ineffective when the pilot needs to give his full attention to flying or the use of other systems (for example weapons or communications systems).

The use of artificial intelligence techniques and more specifically of a system employing a knowledge base and rules, and known by the name of expert system, has also been proposed for determining the reconfigured trajectory to be proposed to the pilot as being the one that is the result of the best compromise between the various requirements of the moment. However, an expert system requires the compiling of a knowledge base and of rules which is difficult to develop for determining a three-dimensional trajectory which also involves time, speed and other parameters, and evaluating its effectiveness at meeting the objectives of the mission as a function of a great many other criteria.

In order to solve this problem, European Patent Application EP 0 617 349 has proposed the use of multiexpert techniques which allow a number of expert systems with knowledge bases and rules each specialized in a given area to collaborate with each other. The process for determining the new trajectory comprises:

analyzing the context and interpreting the event that justifies the reconfiguring of the trajectory in order to determine the actions to be carried out, breaking said actions down into alternatives each consisting of a sequence of elemental actions that can be performed by at least one of the specialist modules, selecting each alternative in turn, using a certain strategy, processing the alternatives selected which, for each alternative, consists in using the specialist expert modules to produce a trajectory using the elemental actions that make up the selected alternative, and evaluating the benefit of the trajectory obtained against at least one criterion, and selecting at least one trajectory which has the best evaluation and presenting it as a solution associated with its evaluation.

This process is still fairly unwieldy to employ because it involves determining a collection of trajectory reconfiguring solutions and choosing the best one from among these.

The present invention proposes a process for reconfiguring a trajectory in real time which, at each moment, results in the detailed determination, usable by an automatic pilot system or a cartographic display, of just one reconfigured trajectory, the choice between the various possible detours for taking account of the advent of an event not taken into consideration during mission preparation being condensed, following an analysis of the real-time airborne vehicle-mission context and the detection of an event that justifies reconfiguring the trajectory, to likening this realtime context to a predefined context category chosen from several stored in memory taking account of different context eventualities and each corresponding to a specific reconfiguration method that results in the detailed determination of just one reconfigured trajectory. The calculation load is lower than in the aforementioned known processes because the reconfigured trajectory is chosen very early on in its precise definition in a form that can be used by an automatic pilot system or by a cartographic display.

More specifically, this process is performed by a computer which, in real time, receives information supplied by equipments on board the airborne vehicle regarding the situation of the airborne vehicle with respect to its spatial and temporal environment, its range and its maneuverability, and stores data regarding the mission of the airborne vehicle which may be updated in the course of the mission, including a nominal trajectory in five dimensions: three spatial dimensions, a time dimension and a dimension which represents the fuel-dependent range, this information constituting a real-time airborne vehicle-mission context, this computer being connected to an automatic pilot device and to a display which gives, on a cartographic background, a depiction of the current trajectory and indicates the current position of the airborne vehicle with respect to this trajectory.

It comprises with a view to adapting the mission to suit a new situation which has arisen as the result of one or more disrupting events:

updating the data relating to the real-time airborne vehicle-mission context that has been altered by the occurrence of the disrupting event, and detecting, within the updated real-time airborne vehicle-mission context, the occurrence of one or more events that justify reconfiguring the nominal trajectory.

It is characterized in that it involves, after the above stages:

selecting, according to the updated real-time airborne vehicle-mission context, a trajectory-reconfiguring method from a collection of predefined trajectory-reconfiguring methods available in memory, each one, when implemented, allowing a single reconfigured trajectory to be obtained, each of these reconfiguration methods being tailored to a specific and predefined category of airborne vehicle-mission context, said selection of a predefined trajectory-reconfiguring method being made by likening the real-time airborne vehicle-mission context to the closest predefined category of airborne vehicle-mission context on the basis of selection criteria relating, in particular, to the values of the spatial, temporal and fuel-dependent range differences observed with respect to the nominal trajectory, the selected predefined trajectory-reconfiguring method directly translating the operational strategy customarily employed by aircrew placed in the chosen predefined category of airborne vehicle-mission context, executing the selected predefined reconfiguration method which, according to the mission data and the real-time context, determines a new trajectory that the automatic pilot system can execute, displaying the new trajectory on the display as an overlay on the current trajectory, and if the pilot validates this new trajectory, transmitting information characterizing this new trajectory to the automatic pilot device.

By virtue of these arrangements, all the operations in selecting a solution for reconfiguring the mission are performed before a trajectory that can be executed directly by an automatic pilot device is actually determined, this determination being expensive in terms of time and processing power. The process according to the invention thus makes it possible, in real time, to propose a trajectory capable of satisfying each new situation at the time it occurs. This speed of response can be obtained using the computers currently fitted on board airborne vehicles, without affecting the other functions performed by these computers and does not require new equipment.

Furthermore, the reconfiguration method selected more or less corresponds to the thought process that a pilot goes through in a similar situation. What this means is that if the pilot does not agree with the new trajectory proposed, he may, by direct action on the airborne vehicle flight controls (speed, heading or altitude), alter the real-time context of the airborne vehicle so as to force the process to calculate a new trajectory which corresponds to the pilot's wishes. He may also force passage through a particular goal or alter one or more mission constraints.

Of course, when the event detected is that the airborne vehicle is ahead of or behind schedule, this new trajectory may correspond to the trajectory previously being followed, with simply a change in the speed at which this trajectory is covered.

The events may originate directly from the various parts connected to the computer. They may also be generated by a task of monitoring the surroundings of the airborne vehicle, which task evaluates parameters on the basis of real-time context data and compares them with thresholds or expected values, the crossing of a threshold or the detection of an unexpected value giving rise to the generating of an event.

Advantageously, the mission data involves three types of constraint, namely spatial constraints (initial trajectory, compulsory waypoints), temporal constraints (rendezvous times), and fuel-dependent constraints, the process according to the invention involving associating each of these types of constraint with a set of respective priority values which give the relative priority with which the constraints of this type are taken into consideration at each stage of the mission, the process according to the invention involving taking all of these sets of priority values into consideration when analyzing the real-time context and executing a reconfiguration method.

The fuel-dependent constraint corresponds to the ability of the airborne vehicle to carry out the mission and land with a sufficient reserve of fuel, given its range which may incorporate in-flight refuelling in the case of military missions.

Thus, if, for example, the spatial constraint takes priority and the airborne vehicle departs from the current trajectory, the process according to the invention will produce a trajectory for regaining that trajectory as a function of the current position of the airborne vehicle and of the presence of a compulsory waypoint near the airborne vehicle.

Advantageously, updating the real-time airborne vehicle-mission context involves analyzing the real-time situation otherwise known as monitoring the environment, to take account of:

- the mission, defined by information recorded prior to flight or received during flight, including the five-dimensional nominal trajectory, notes on danger areas, compulsory waypoints, etc.,
- data specific to the airborne vehicle, such as its spatio-temporal position, the amount of fuel actually available, its phase of flight, newly appeared obstacle zones, predicted changes in flight phase, any faults which may have occurred, changes in weather conditions, etc.

Advantageously, the predefined trajectory-reconfiguring methods each call on a specialist module chosen from a set of specialist modules common to them and each capable of solving a specific problem in the reconfiguring of an itinerary.

Advantageously, said specialist modules each solve a specific problem in the reconfiguring of an itinerary in the five dimensions in space, time and fuel-dependent range, such as:

- cutting short the 5D trajectory,
- extending the 5D trajectory,
- 5D trajectory for avoiding a new or otherwise threat,
- 5D trajectory for regaining a 5D itinerary with threat avoidance,
- 5D trajectory for regaining a 5D itinerary with threat avoidance and with a compulsory destination,
- 5D direct return/emergency return trajectory over terrain that is accessible in terms of weather/fuel,
- modification of speed when behind schedule on SD trajectory,
- modification of speed when ahead of schedule on SD trajectory,
- 5D trajectory for managing in-flight refuelling,
- 5D trajectory to take account of a change in constraint,
- 5D trajectory for constructing a modified flight plan.

Advantageously, the predefined configuration methods are of finite depth, that is to say that the specialist modules on which they depend resort to only a limited number of solution steps, each solution step consisting in solving a partial reconfiguration problem. That makes it possible to guarantee that a proposed reconfigured 5D trajectory best suited to the changing context of a mission will be produced and displayed in a limited amount of time. As the time taken to formulate a proposed reconfigured trajectory is controlled, this proposal can be updated periodically at a sufficiently high frequency, for example of the order of 1 hertz, to give the pilot of the airborne vehicle a constant picture of the available possibilities for reconfiguring his trajectory.

BRIEF DESCRIPTION OF THE DRAWINGS

One embodiment of the process according to the invention will be described hereinafter by way of non-limiting example with reference to the appended drawings in which.

DESCRIPTION OF THE PREFERRED EMBODIMENTS

Figure 1:
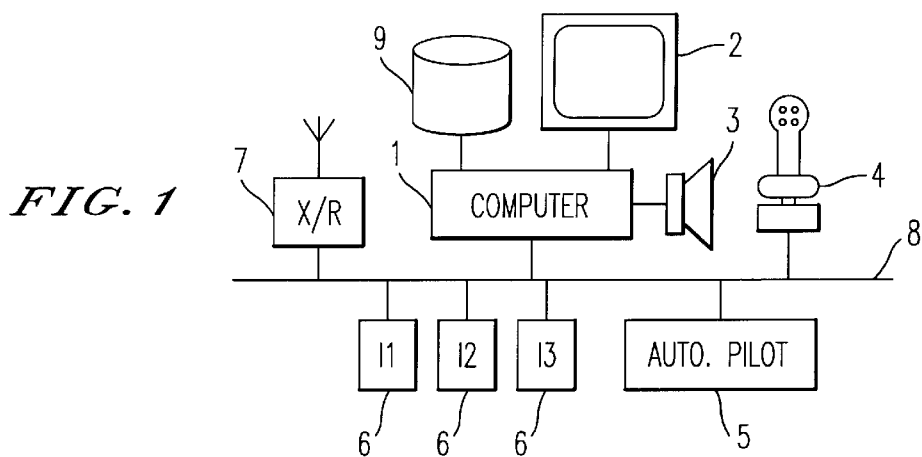
FIG. 1 diagrammatically depicts the electronic equipment on board an airborne vehicle and which allows the process according to the invention to be implemented.

The process according to the invention is particularly suited to implementation by electronic equipment on board an airborne vehicle. As depicted in FIG. 1, this equipment comprises a computer 1 connected to one or more display screens 2, a mass memory 9, and possibly an alarm-raising device, coupled to a loud speaker 3 and/or light indicators. This computer 1 is connected by a data transmission network 8, for example the aircraft bus, to the on-board flight instruments and sensors 6, to the flight controls 4, to an automatic pilot device 5 and to a digital data radio transmission device 7 for example of the data link type. Thus, the computer 1 may, in real time, acquire data from the other on-board items of electronic equipment and, in particular, obtain the geographical position of the airborne vehicle, its altitude, its speed, its status and the amount of fuel available.

The automatic pilot device comprises a memory in which the current trajectory followed by the airborne vehicle is recorded, this trajectory consisting of a succession of straight-line segments between a start point and destination point, these segments being connected by arcs of circles.

The mass memory 9 contains the characteristics of the airborne vehicle and, in particular, data defining its maneuverability, such as the minimum and optimum turn radius as a function of speed, and the fuel consumption as a function of speed, and all the data relating to the mission. This mission data comprises, in particular:

- mission geographical environment, tactical and weather data,
- data relating to the flight plan, associated with an intended three-dimensional trajectory making it possible for the computer, in particular, to display this trajectory on the screen as an overlay on an image of the map, and
- data relating to the speed, route and fuel constraints associated with each stage of the mission, the fuel or range constraint corresponding to the ability to carry out the mission and land, accounting for a given fuel reserve or for intended in-flight refuelling, in the case of military missions.

The geographical environment data comprises cartographic data which allows the computer 1, in particular, to display on the screen 2 an image of a geographical map of the area being overflown during the mission, and data relating to the navigation, for example the geographical position and characteristics of radio beacons and airfields that the airborne vehicle can reach during the mission. The tactical environment data comprises, in particular, the position and spread of any danger areas that are to be avoided, while the weather environment data comprises the weather conditions anticipated during the mission in the area being overflown. The data relating to the intended trajectory comprises the position of the compulsory waypoints associated with a rendezvous time and an overfly altitude.

All this data can be modified at any moment either directly by the pilot or the on-board sensors and instruments, or on the basis of information received via the radio link.

Figure 2:
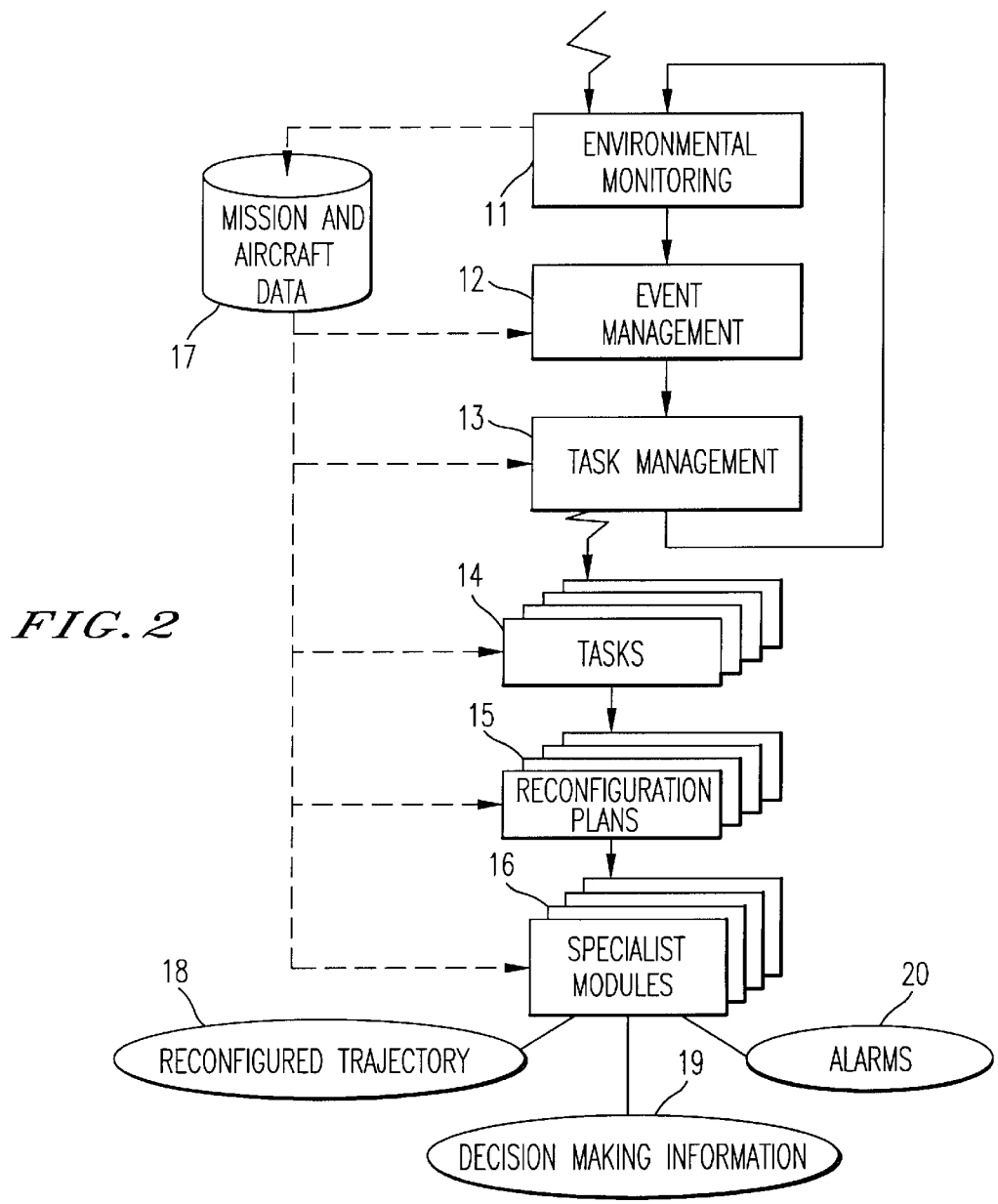
FIG. 2 illustrates the process according to the invention in the form of a block diagram.
Figure 3:
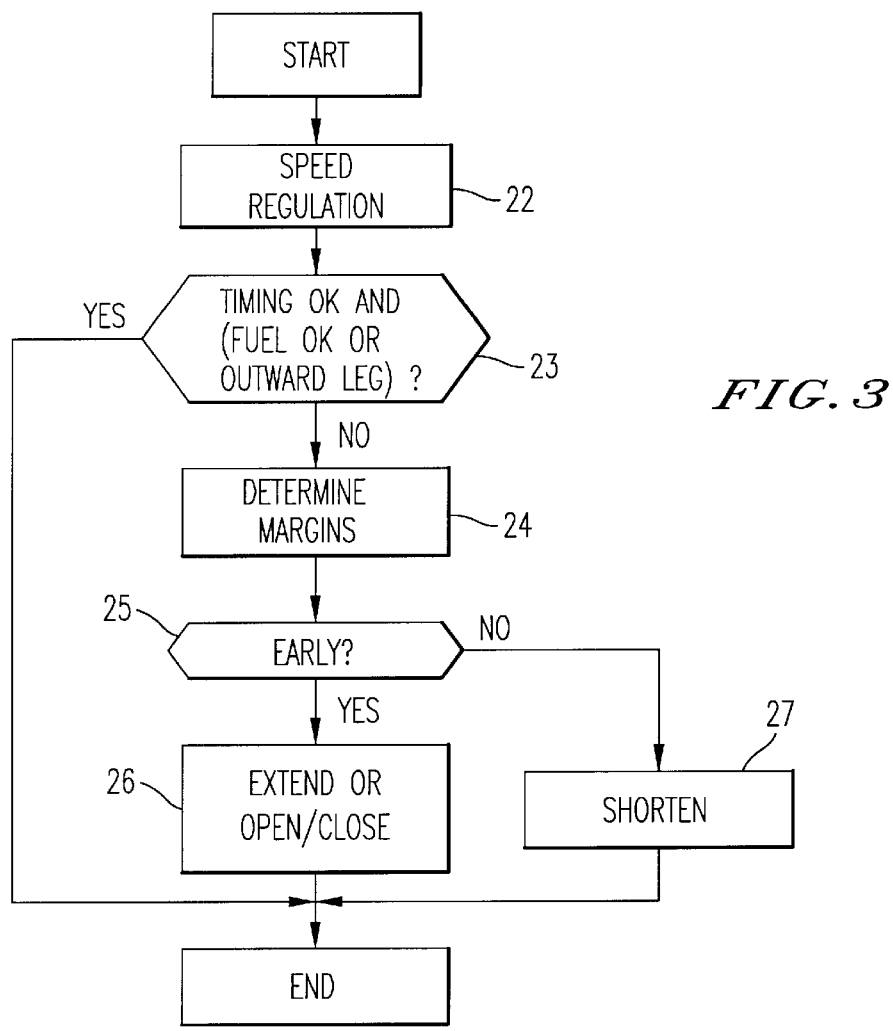
FIG. 3 diagrammatically shows an algorithm that represents one example of a reconfiguration plan employed by the process according to the invention.

The mass memory 9 also comprises, in the form of software, a collection of predefined trajectory-reconfiguring methods each of which, when implemented, is able to determine, in a form suited to the automatic pilot system or in the form of a cartographic display screen, just one reconfigured trajectory and a process for selecting, if need be, that predefined trajectory-reconfiguring method which is best suited to the situation of the moment. The predefined trajectory-reconfiguring methods differ from one another and are tailored to different predefined airborne vehicle-mission contexts which take account of most of the events that will involve reconfiguring the nominal trajectory and which may arise unpredictably in the course of a mission. Each of them translates the operational strategy customarily employed by aircrew placed in the predefined airborne vehicle-mission context for which it is intended. An example of a predefined reconfiguration method is depicted in FIG. 3. In FIG. 2, the process according to the invention involves a main task performed cyclically and comprising:

- an environment monitoring module 11, the task of which is to monitor the environment of the mission and the real-time context 17 and, in particular, to detect the events which jeopardize the initial flight plan.
- an event management module 12, the role of which is to allocate an order of priority to each event detected and jeopardizing the configuration of the flight plan according to the relative importance assigned at the time, to the spatial, temporal or fuel-dependent range constraints and, possibly, to assign several of these when the airborne vehicle-mission context involves processing them simultaneously,
- a task management module 13 which activates and deactivates the tasks 14, that is to say calculation times each specifically allocated to processing an event or a particular combination of events detected by the event management module 12 and manages the sharing of computer time between all the active tasks by taking account of the degrees of priority allocated to the events or to the combinations of events to which they correspond. The task which corresponds to the event or combination of the events with the highest priority leads to the sole reconfigured trajectory proposal made at the time to the pilot. The other tasks which take lower priority do not immediately give rise to a reconfigured trajectory proposal, but anticipate the execution of the mission. They may be deferred according to the context and the execution of the missions or even deleted once the events to which they relate become obsolete, even if these have not been fully dealt with.

Another role of the monitoring module 11 is to update the real-time context and mission data 17 when new data is received. The real-time context groups together the current data relating in particular to the position of the airborne vehicle, its altitude, its speed and its heading, the amount of fuel available in the tanks, the degree of coupling of flight controls (whether or not the automatic pilot is engaged), and the current phase of the mission (whether the airborne vehicle is in an enemy or friendly zone, before or after the objective). It also stores a history of the mission, in particular indicating whether the current trajectory is the one initially intended, whether a breakdown has occurred, and whether emergency return or in-flight refuelling has been requested.

The tasks 14 activated by the task management module 13 may be cyclic or random (triggered by an event), executable exclusively or otherwise. Thus, for example, a task which proposes a trajectory to the pilot is executed cyclically to take account of the change in the real-time context, until such time as the pilot validates the trajectory proposed in order to make it active. In general, all the tasks which provide a new trajectory are cyclic and exclusive with respect to other tasks of this type. Thus, the trajectory calculated and displayed on the display 2 is replaced cyclically by a new calculated trajectory so that the trajectory displayed is never obsolete.

Each task sets out to solve the problem posed by a particular event or particular combination of events using a predefined method for reconfiguring the trajectory which is the one best suited to the real-time airborne vehicle-mission context, chosen from the collection of predefined reconfiguration methods 15 available in memory. To do that, a task is broken down into two parts, selecting a predefined trajectory-reconfiguring method and executing the selected predefined trajectory-reconfiguring method. As each of these predefined reconfiguration methods 15 is tailored to a specific category of predefined airborne vehicle-mission context, which takes account of various events requiring a trajectory to be reconfigured and which may occur without warning, selecting one of them is performed by likening the real-time airborne vehicle-mission context that takes account of the event associated with the task in question, to the closest category of predefined airborne vehicle-mission context using selection criteria relating in particular to the values of the spatial, temporal and fuel-dependent range differences observed with respect to the nominal trajectory. Execution of the selected predefined trajectory-reconfiguring method 15 calls upon a specialist module chosen from a collection of specialist modules 16 available in memory and each of which solves a specific problem in reconfiguring an itinerary in the five dimensions of space, time and fuel-dependent range, such as:

- cutting short the 5D trajectory,
- extending the 5D trajectory,
- 5D trajectory for avoiding a new or otherwise threat
- 5D trajectory for regaining a 5D itinerary with threat avoidance,
- 5D trajectory for regaining a 5D itinerary with threat avoidance and with a compulsory destination,
- 5D direct return/emergency return trajectory over terrain that is accessible in terms of weather/fuel,
- modification of speed when behind schedule on 5D trajectory,
- modification of speed when ahead of schedule on 5D trajectory,
- 5D trajectory for managing in-flight refuelling,
- 5D trajectory to take account of a change in constraint,
- 5D trajectory for constructing a modified flight plan.

These specialist modules receive, by way of parameters, the mission and real-time context data they need. In addition to solving the specific trajectory reconfiguration problems in which they specialize, the specialist modules 16 also supply information 19 for assisting with decision making, in combination with the trajectory 18 they are proposing, and may set off alarms 20, for example when the problem that is to be solved has no solution.

It should be noted that some of the specialist modules, known as high-level modules, may call upon specialist modules of a lower level.

Provision is made for providing the pilot with information on request. When the computer 1 detects that the command for doing this has been actuated by the pilot of the airborne vehicle, and that the type of information desired has been selected, the environment monitoring module 11 stores within the real-time context data 17 the fact that the pilot has requested a particular type of information, and generates the corresponding information request event. The event management module 12 detects the occurrence of this event, and calls upon the task management module 13 to ask it to process this event. The task management module 13 then triggers a random, non-exclusive and high-priority task 14 to determine the information required, this task calling upon the predefined trajectory-reconfiguring method 15 tailored to pilot requests, which will make use of that or those specialist module(s) 16 that allow said problem to be solved. The requested information 19 is finally displayed on the screen 2.

To illustrate the role of each of the elements 11 to 16, let us assume that the pilot operates the throttle to reduce the speed of the airborne vehicle, which is on its initial trajectory in the outbound phase (before the objective) and over enemy territory.

The environment monitoring module 11 detects that the speed of the airborne vehicle is not the speed intended and that as a result of this the airborne vehicle will not be able to reach the objectives at the intended times, and generates a time event. It is also possible to envisage for the environment monitoring module to generate an alarm through the alarm-generating device 3, particularly upon detection of a disrupting event liable to jeopardize the current trajectory.

The event management module 12 receives this event and allocates an order of priority to it.

The task management module 13 allocates it a task whose type: cyclic or otherwise, exclusive or otherwise according to the event in question is determined, and manages this task together with all the other on-going tasks. This management includes a filtering process that allows said task to be deferred or deleted if it becomes apparent that another on-going task has already been allocated to the same event or if it becomes apparent that said event is the consequence of the execution of another on-going task dealing, for example, with a breakdown. If the task gets through the filtering process it is taken into consideration and executed along with the others, taking its level of priority into account. Executing it may lead to deleting other tasks which are being executed because they have become obsolete when this arrived.

The task corresponding to the time event allows the timing to be maintained and is cyclic and exclusive. It has a fairly low priority, for example 2 on a scale from 1 to 10. It should be noted, for example, that when in-flight refuelling is envisaged, the generating of the trajectory towards the rendezvous circuit takes a higher priority because it governs both the spatial and the temporal difference.

When no task of higher priority is being executed, the task of maintaining the timing is triggered, while all the other active tasks of lower priority are interrupted.
This task may of course be interrupted (deleted if exclusive) by the arrival of more important events such as the detection of a spatial difference from the current trajectory, the passage into another zone of the mission, request for emergency return, the designation of a new destination target or alternatively, the advent of a breakdown.

The task of maintaining the timing executes the predefined trajectory-reconfiguring method the algorithm of which is depicted in FIG. 3.

In the first stage of this predefined trajectory-reconfiguring method, the computer 1 runs a specialist module 22 for regulating the speed designed to recalculate the journey speeds of the current trajectory while taking account of the position of the airborne vehicle on this trajectory, of the temporal and spatial constraints imposed by the mission, of the maneuverability of the airborne vehicle and of the amount of fuel available, this information being supplied by the mass memory 9.

In response, this module 22 indicates whether the constraints imposed by the mission can be satisfied by following the current trajectory, with a sufficient fuel margin, bearing in mind the current phase of the mission (outward or return leg). If it can, it supplies a trajectory identical to the current one, but with a new journey speed profile. In stage 23 of this predefined trajectory-reconfiguring method, the computer determines whether the module 22 has solved the timing problem. If it has, then the predefined trajectory-reconfiguring method is ended and the current trajectory with the new speed profile is proposed to the pilot. If not, it continues by calling upon the specialist module 24 for determining margins, which allows the time and fuel differences of the current trajectory to be evaluated against the intentions. If the airborne vehicle is ahead of schedule on its trajectory without any problem of fuel-dependent range (stage 25), then the predefined trajectory-reconfiguring method calls upon another specialist module 26 for calculating an extended trajectory in order to use up the spare time that the airborne vehicle has. If not, it calls upon a specialist module 27 for calculating a shortened trajectory.

In all cases, this algorithm supplies a new trajectory that the computer 1 proposes to the pilot by displaying it on the screen 2 as an overlay on the current trajectory. Through a simple command, for example actuating a button on the stick 4, the pilot can validate this new trajectory, which triggers its transmission by the computer 1 to the automatic pilot device 5.

It should be noted that this predefined trajectory-reconfiguring method can be called upon by other predefined trajectory-configurating methods 15 in which the time aspect needs to be dealt with.

The pilot can, at any time, force activation of one of the specialist modules 26 or 27 by resuming control of the flight controls and adopting a trajectory which will logically trigger such activation.

Figure 4:
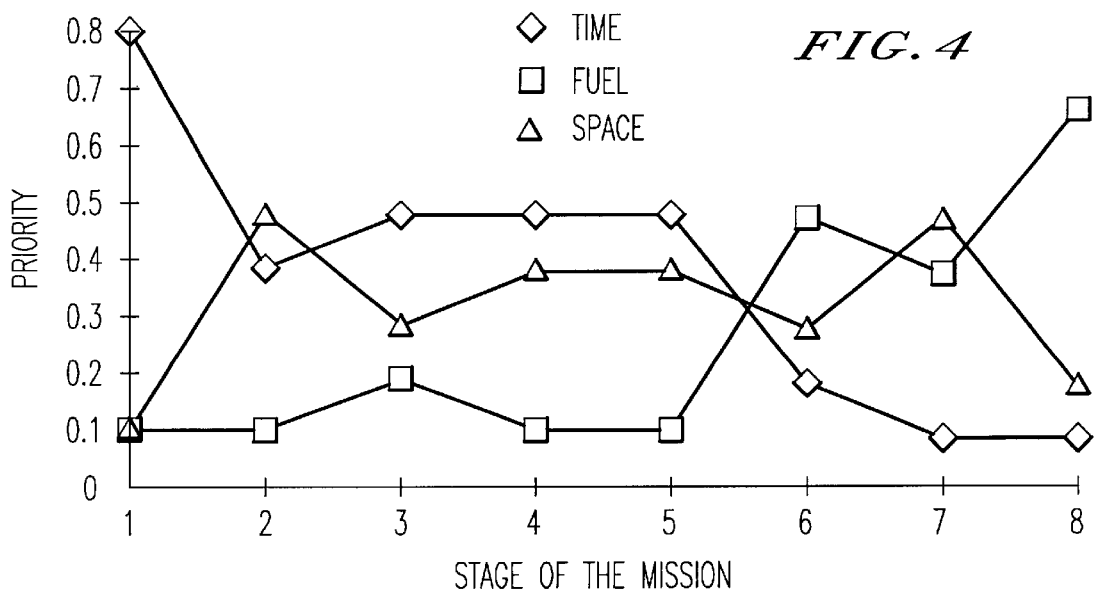
FIG. 4 shows, in the form of curves, the values of the respective priorities on the time, space and fuel constraints at each stage of the mission.

According to one particular feature of the invention, respective priority values are allocated to the spatial, temporal and fuel constraints for each stage of a mission, as shown in the curves depicted in FIG. 4. These priority ratings which form part of the mission data are taken into consideration by the event management module 12 when determining the most important event to be processed, by the task management module 13, in the predefined trajectory-reconfiguring methods 15 and in the specialist modules to determine the trajectory which best solves the problem posed by the event that is being dealt with.

Thus, in FIG. 4, the time constraint takes a very much higher priority during the first stage of the mission. During this stage, the task management module 13 will, as a matter of priority, select those events which have an impact on the keeping of the timing of the mission. Thereafter, during stages 2 to 4 of the mission, the priorities accorded to the space and time constraints are practically equivalent, and the reconfigured trajectories produced will therefore favor the following of the initial trajectory in the envisaged time. At stage 5, the priorities of the three constraints of time, space and fuel are approximately equivalent. What this means is that the trajectories that will be produced will not favor any one of these constraints. In stages 6 to 8 which correspond to the return phase, the fuel constraint is of prime importance, this being something which is justified by the fact that the amount of fuel available and the consumption of the airborne vehicle govern the arrival thereof at the intended return base. Stage 7 is marked by a spatial constraint which corresponds, during this stage to the presence of a compulsory waypoint.

Thus, the constraints applied to the mission are taken into consideration right from the start of dealing with an event and when selecting a predefined trajectory-reconfiguring method, before the calculations (which are expensive in terms of processing power and calculation time) of determining a reconfigured trajectory, are performed.

The computers that are on board current airborne vehicles may, by virtue of the process which has just been described, calculate a relevant new trajectory about once every second. Bearing in mind the speeds of present-day civilian or military aircraft, and the authorized margin of error, the trajectories thus proposed to the pilot are never obsolete.

The process just described for the real-time reconfiguring of a trajectory for an airborne vehicle has an architecture, or sequence of stages, which makes for a clear distinction between knowledge specific to each area of solution (type of trajectory; horizontal, vertical, avoidance, refuelling, shortening of trajectory, extending of trajectory, passage through compulsory areas) from the knowledge which allows checking relative to the strategies for solving the problems.

The predefined trajectory-reconfiguring methods suited to the various categories of most probable airborne vehicle-mission contexts which may present themselves to an aircrew in the event of unforeseen events, involving contributions from specialist modules which deal with specific trajectory-reconfiguring problems, advantageously employ a limited number of steps so as to guarantee that a reconfigured trajectory can be proposed in a limited length of time regardless of the airborne vehicle-mission context. This proposed reconfigured trajectory can then be updated periodically so as to give the pilot a constant picture of the mission reconfiguration options.

What is claimed is:

1. A process for the real-time reconfiguring of a trajectory for an airborne vehicle, this trajectory being executable, in particular, by an automatic pilot device, this process being performed by a computer which, in real time, receives information supplied by equipments on board the airborne vehicle regarding the situation of the airborne vehicle with respect to its spatial and temporal environment, its range and its maneuverability, and stores data regarding the mission of the airborne vehicle which may possibly be updated in the course of the mission, including a nominal trajectory in five dimensions: three spatial dimensions, a time dimension and a dimension which represents the fuel-dependent range, this information constituting a real-time airborne vehicle-mission context, this computer being connected to an automatic pilot device and to a display which gives a depiction of the current trajectory and indicates the current position of the airborne vehicle with respect to this trajectory, said process comprising, with a view to adapting the mission to suit a new situation which has arisen as the result of a disrupting event:

updating the data relating to the real-time airborne vehicle-mission context that has been altered by the occurrence of the disrupting event, and detecting, within the updated real-time airborne vehicle-mission context, the occurrence of one or more events that justify reconfiguring the nominal trajectory, and being characterized in that it involves, after the above stages:

selecting, as soon as an event that justifies reconfiguring the nominal trajectory is detected, according to the updated real-time airborne vehicle-mission context, a trajectory-reconfiguring method from a collection of predefined trajectory-reconfiguring methods available in memory in the computer, each one, when implemented, allowing a single reconfigured trajectory to be obtained, each of these predefined trajectory-reconfiguring methods being tailored to a specific and predefined category of airborne vehicle-mission context, said selection of a predefined trajectory-reconfiguring method being made by likening the real-time airborne vehicle-mission context to the closest predefined category of airborne vehicle-mission context on the basis of selection criteria relating, in particular, to the values of the spatial, temporal and fuel-dependent range differences observed with respect to the nominal trajectory, the selected predefined trajectory-reconfiguring method directly translating the operational strategy customarily employed by aircrew placed in the chosen predefined category of airborne vehicle-mission context, executing the selected predefined reconfiguration method which, according to the mission data and the real-time context, determines a new trajectory that the automatic pilot system can execute, displaying the new trajectory on the display as an overlay on the current trajectory, and if the pilot of the airborne vehicle validates this new trajectory, transmitting information characterizing this new trajectory to the automatic pilot device.

2. The process claimed in claim 1, characterized in that the predefined reconfiguration methods involve a limited number of steps in order to guarantee that a reconfigured trajectory can be proposed in a limited amount of time regardless of the real-time airborne vehicle-mission context.

3. The process claimed in claim 1, characterized in that updating the real-time airborne vehicle-mission context involves analyzing the real-time situation otherwise known as monitoring the environment, to take account of:

data specific to the mission and containing information recorded prior to flight or received during flight, including the five-dimensional nominal trajectory, notes on danger areas, compulsory waypoints, etc., data specific to the airborne vehicle, such as its spatio-temporal position, the amount of fuel actually available, its phase of flight, newly appeared obstacle zones, predicted changes in flight phase, any faults which may have occurred, changes in weather conditions, etc.

4. The process claimed in claim 3, characterized in that the mission data contains a table of constraint priority values which give the priority values for constraints in terms of time, space and fuel to each stage of the current mission, the process involving taking these priority values into consideration when analyzing the real-time context in order to select a predefined reconfiguration method and when executing a predefined configuration method in order to determine a new trajectory.

5. The process claimed in claim 1, characterized in that a predefined reconfiguration method is executed during an independent task which may or may not be of the exclusive type, random or cyclic.

6. The process claimed in claim 1, characterized in that a predefined trajectory-reconfiguring method is executed cyclically, to take account of the change in the real-time airborne vehicle-mission context, the calculated new trajectory replacing the previously proposed trajectory on the display so that the trajectory displayed on the display is always relevant to the real-time airborne vehicle-mission context.

7. The process claimed in claim 1, characterized in that, in order to supply information on demand, it involves updating the real-time context to store the fact that a request for information has been made, generating an information-request event, and activating a task to execute a specific predetermined reconfiguration method designed to determine and display the requested information, this task being random and of a high level of priority so that the requested information can be displayed quickly.

* * * * *